March 10, 1953     R. E. REEVE     2,630,783
RELEASER ASSEMBLY FOR CONTINUOUS MILKING SYSTEMS
Filed June 12, 1951
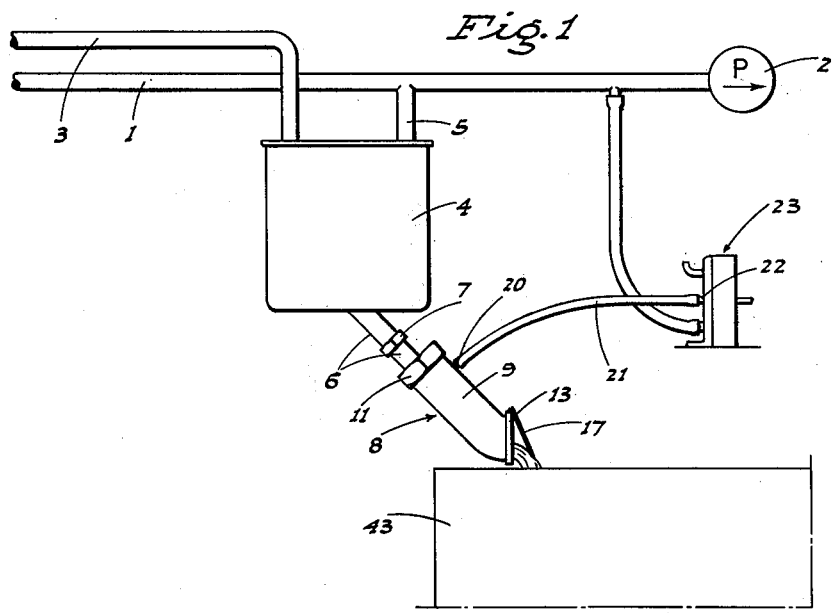
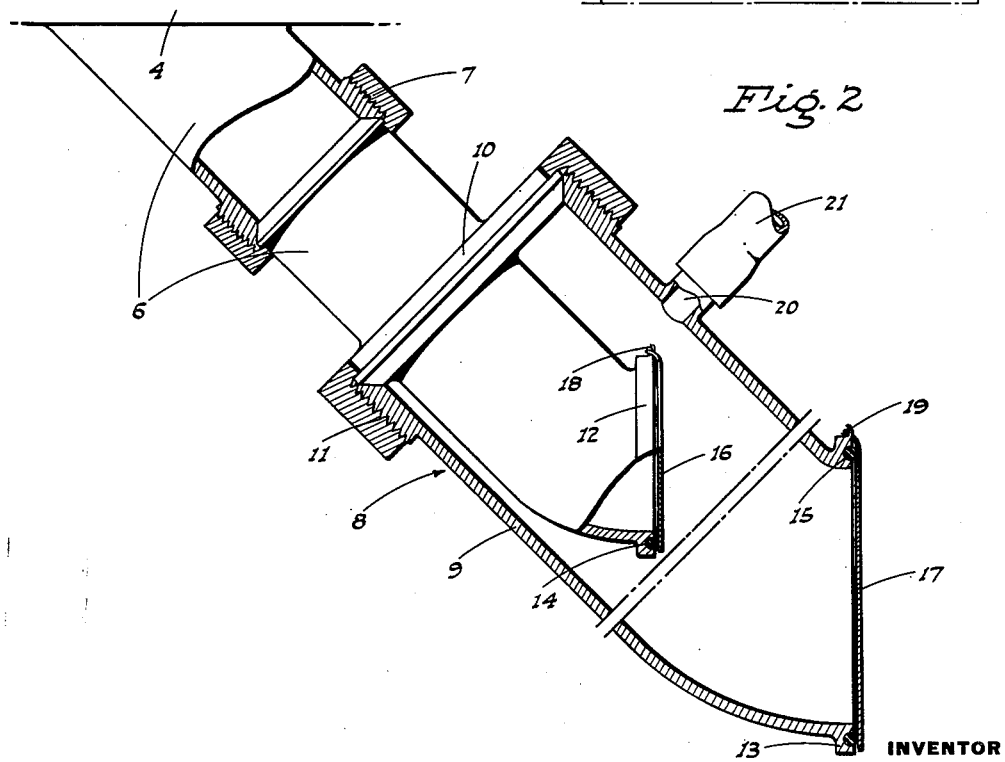
INVENTOR
Robert E. Reeve
BY Webster & Webster
ATTORNEYS Patented Mar. 10, 1953

2,630,783

UNITED STATES PATENT OFFICE 2,630,783

RELEASER ASSEMBLY FOR CONTINUOUS MILKING SYSTEMS

Robert E. Reeve, Tracy, Calif.

Application June 12, 1951, Serial No. 231,201

2 Claims. (Cl. 119—14.07)

This invention relates generally to improvements in a continuous milking system for dairies; the system being of the type which includes a milk flow pipe carrying milk, by vacuum, from the bucket units to an enclosed tank or receiver; the tank likewise being under vacuum, and a releaser assembly being required to accomplish discharge of the milk from the tank without breaking the vacuum therein.

It is a major object of the present invention to provide a novel releaser assembly for use in connection with the milk receiving tank of a continuous milking system, as above.

Another important object of this invention is to provide a releaser assembly, for the purpose described, which includes a milk releasing valve unit in communication with the milk receiving tank; such unit embodying an enclosed, valve controlled, milk transfer lock of novel construction and function.

A further object of this invention is to provide a milk transfer lock, as in the preceding paragraph, wherein said lock is actuated in response to vacuum and atmospheric pressure in alternation, which alternation is produced by a driven rotary valve of simple, yet effective construction.

An additional object of this invention is to provide a releaser assembly for a continuous milking system, and particularly a milk transfer lock, wherein the parts are readily manually separable for the purpose of washing and sterilization.

It is also an object of the invention to provide a releaser assembly, for a continuous milking system, which is designed for ease and economy of manufacture, initial installation, and subsequent use.

Still another object of the invention is to provide a practical and reliable releaser assembly for a continuous milking system, and one which will be exceedingly effective for the purpose for which it is designed.

These objects are acomplished by means of such structure and relative arrangement of parts as will fully appear by a perusal of the following specification and claims.

In the drawings:

Fig. 1 is a diagrammatic elevation of the releaser assembly, for a continuous milking system, as in use; the milk transfer lock being open and discharging a quantity of milk.

Fig. 2 is an enlarged fragmentary sectional elevation showing particularly the milk transfer lock.

Referring now more particularly to the characters of reference on the drawings, the numeral 1 indicates the vacuum pipe of a continuous milking system; such pipe being connected at one end to a vacuum pump 2, and at the other end portion extending into the dairy barn, with suitable fittings (not shown) for connection with the hoses which lead to the bucket units.

Milk from said bucket units feeds back by vacuum in a milk flow pipe 3 to which the outlet hoses of said bucket units are connected; the milk flow pipe 3 delivering into the top of an enclosed milk receiving tank 4 likewise under vacuum. The vacuum in the pipe 3 and tank 4 is produced by means of a lateral 5 connected between the vacuum pipe 1 and the top of said tank, as shown.

The milk from the pipe 3 flows substantially continuously into the tank 4, and in order to maintain the milking system properly in operation such milk must be withdrawn from the tank without breaking the vacuum therein.

This is accomplished by means of the following novel releaser assembly:

A downwardly inclined outlet pipe 6 leads from the bottom of the enclosed, milk receiving tank 4, and such pipe 6 has a union 7 therein.

Below the union 7 the outlet pipe 6 projects into and becomes a part of an enclosed valve controlled, milk transfer lock, indicated generally at 8, and which lock likewise extends at a downward incline.

The milk transfer lock 8 comprises an elongated tubular barrel 9 normally closed at the upper end by a closure flange 10 formed on the pipe 6 intermediate the union 7 and the lower end of such pipe. The closure flange 10 has tapered seating engagement in the adjacent end of the barrel 9, as shown, and is normally held in place by a ring nut 11.

The pipe 6 projects into the barrel 9 below the flange 10, but said pipe terminates at its lower end intermediate the ends of such barrel.

At their lower ends both the pipe 6 and the barrel 9 turn to a horizontal axis, and at said ends are fitted with vertical valve seats, indicated at 12 and 13, fitted with annular gaskets 14 and 15, respectively.

Flap valves 16 and 17 are removably suspended, as at 18 and 19, from the tops of the valve seats 12 and 13, respectively, whereby such flap valves hang in closed position by gravity.

A fitting 20 communicates with the barrel 9 at the top above the valve seat 12 and flap valve 16.

A hose 21 connects at one end to the fitting 20 and at the other end to a central fitting 22 on the front of a suitable rotary, alternating valve pulsator, indicated at 23, and which is operative to impart vacuum and atmospheric pressure to the hose 21 and consequently to the interior of the barrel 9.

In operation of the above described releaser assembly, for a continuous milking system, the vacuum in the enclosed, milk receiving tank 4 tends to hold the flap valve 16 tightly closed against the valve seat 12, so that milk cannot escape from said tank 4, nor is the vacuum in the latter broken.

In order to discharge milk from the tank 4 into an adjacent, open-to-atmosphere reservoir 43, the described milk transfer lock 8 is provided, and which lock has its lower end directly above said reservoir.

The rotary pulsator valve 23, which is constantly driven, causes vacuum and atmospheric pressure to alternately exist in the barrel 9 of the milk transfer lock 8.

Each time that vacuum is imparted to the barrel 9, the flap valve 17 is closed tightly against the seat 13; the vacuum in the barrel 9 balancing the vacuum in the pipe 6, whence milk in said pipe swings the flap valve 16 open and drops into the lower portion of said barrel 9.

After a predetermined portion of milk so delivers into the barrel 9, the vacuum in said barrel is supplanted by atmospheric pressure, whereupon the flap valve 16 immediately tightly closes and the milk in the lower portion of barrel 9 swings flap valve 17 open and falls by gravity into the reservoir 13.

This alternating action is continuous, with the rate or volume of discharge predetermined so that the enclosed milk receiving tank 4 never becomes full, and which would be undesirable, as milk could then flow through the lateral 5 into the vacuum pipe 1 and impair the functioning of the milking system.

The described releaser functions quite effectively for the intended purpose; providing a practical and reliable device, and one wherein all the parts are readily separable—when the system is not in use—for cleaning and sterilizing.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a milking system having an enclosed milk-receiving container under vacuum and a rigid conduit depending at an angle therefrom; a milk releaser unit comprising a relatively short pipe detachably coupled with the lower end of the conduit in alinement therewith, a substantially vertical flap valve mounted on the lower end of the pipe, a relatively large-diameter barrel about the lower portion of the pipe and extending below the same, a substantially vertical flap valve on the lower end of the barrel, a hose fitting projecting from the upper side of the barrel and adapted for connection with vacuum and atmospheric pressure alternately, and means detachably connecting the pipe to the barrel and comprising a disc rigid with the pipe intermediate the ends thereof and formed to seat against the peripheral edge of the barrel, and a nut on the barrel to overhang the disc and clamp the same in airtight relation with the barrel.

2. A releaser, as in claim 1, in which the pipe is offset downwardly in the barrel relative to the axis thereof, the disc being eccentrically mounted on the pipe and the fitting being adjacent but above the flap valve on the pipe.

ROBERT E. REEVE.

REFERENCES CITED

The following references are of record in the file of this patent:

UNITED STATES PATENTS

| Number | Name | Date |
| --- | --- | --- |
| 1,159,185 | Davis et al. | Nov. 2, 1915 |
| 1,332,318 | Bower | Mar. 2, 1920 |
| 1,546,437 | Daysh | July 21, 1925 |
| 1,562,770 | Jamieson | Nov. 24, 1925 |
| 1,644,435 | Knapp | Oct. 4, 1927 |
| 2,367,319 | Wahlberg | Jan. 16, 1945 |
| 2,467,512 | Weiby | Apr. 19, 1949 |
| 2,583,723 | Berry | Jan. 29, 1952 |